(12) United States Patent
Önnheim

(10) Patent No.: US 12,016,346 B2
(45) Date of Patent: Jun. 25, 2024

(54) METHOD FOR PRODUCING FAT STANDARDIZED MILK PRODUCTS AND A SYSTEM THEREOF

(71) Applicant: Tetra Laval Holdings & Finance S.A., Pully (CH)

(72) Inventor: Magnus Önnheim, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 840 days.

(21) Appl. No.: 17/251,825

(22) PCT Filed: Jun. 19, 2019

(86) PCT No.: PCT/EP2019/066261
§ 371 (c)(1),
(2) Date: Dec. 14, 2020

(87) PCT Pub. No.: WO2019/243447
PCT Pub. Date: Dec. 26, 2019

(65) Prior Publication Data
US 2021/0251250 A1    Aug. 19, 2021

(30) Foreign Application Priority Data
Jun. 21, 2018  (EP) ..................................... 18179036

(51) Int. Cl.
*A23C 9/15*       (2006.01)
*A01J 11/10*      (2006.01)

(52) U.S. Cl.
CPC ............. *A23C 9/1508* (2013.01); *A01J 11/10* (2013.01)

(58) Field of Classification Search
CPC ..... A23C 9/142; A23C 9/1422; A23C 9/1425; A23C 9/15; A23C 9/1508; A23C 9/1516;
(Continued)

(56) References Cited

U.S. PATENT DOCUMENTS

| 3,961,570 A | 6/1976 | Sanden |
| 3,983,257 A | 9/1976 | Malmberg |

(Continued)

FOREIGN PATENT DOCUMENTS

| CN | 1325273 A | 12/2001 |
| DE | 2627982 A1 | 1/1978 |

(Continued)

OTHER PUBLICATIONS

International Search Report for corresponding Application No. PCT/EP2019/066261, dated Jul. 30, 2019.
(Continued)

*Primary Examiner* — Hung D Nguyen
(74) *Attorney, Agent, or Firm* — Renner, Otto, Boisselle & Sklar, LLP

(57) ABSTRACT

A method for producing a fat standardized milk product, including separating raw milk into cream and skim milk, wherein the cream is fed to a main cream pipe and the skim milk is fed to a skim milk pipe, dividing the cream in the main cream pipe into a cream remixing pipe and a cream surplus pipe, combining the cream in the cream remixing pipe and the skim milk in the skim milk pipe into the fat standardized milk product, wherein the fat standardized milk product is fed to a product pipe, wherein controlling a flow rate in the cream remixing pipe by regulating a valve placed in the cream surplus pipe.

14 Claims, 2 Drawing Sheets

(58) Field of Classification Search
CPC ... A01J 11/00; A01J 11/10; A01J 11/12; A01J 11/14; A01J 11/16
See application file for complete search history.

(56) References Cited

U.S. PATENT DOCUMENTS

| | | |
|---|---|---|
| 4,017,643 A | 4/1977 | Lester |
| 4,074,622 A | 2/1978 | Niemeyer |
| 4,075,355 A | 2/1978 | Pato |
| 5,260,079 A | 11/1993 | Zettier et al. |
| 5,591,469 A | 1/1997 | Zettier |
| 5,928,702 A | 7/1999 | Lidman |
| 2018/0368430 A1* | 12/2018 | Muuronen ........... A23C 9/1427 |

FOREIGN PATENT DOCUMENTS

| | | |
|---|---|---|
| DE | 32 38 462 A1 | 4/1984 |
| FR | 809378 A | 3/1937 |
| FR | 1496476 A | 9/1967 |
| GB | 460006 A | 1/1937 |
| WO | 90/00862 A1 | 2/1990 |
| WO | 2000013518 A1 | 3/2000 |

OTHER PUBLICATIONS

Extended European Search Report for corresponding Application No. 18179036.1, dated Jan. 9, 2019.
Jean-Paul Julien ED—Kilcawley KN et al.: "Dairy Science and Technology", Dairy Science & Technology, Institut National De La Recherche Agronomique, INRA, FR, Jan. 1, 1985 (Jan. 1, 1985), pp. 167-171, XP002662979, ISSN: 1958-5586 figure VI. 10.

* cited by examiner

METHOD FOR PRODUCING FAT STANDARDIZED MILK PRODUCTS AND A SYSTEM THEREOF

TECHNICAL FIELD

The invention relates to fat standardization technology. More particularly, it relates to a method for producing at least one fat standardized milk product and a system thereof.

BACKGROUND ART

Fat standardization within in the dairy industry is a well-known concept that is used in most dairies of today. In short, the general principle is that raw milk is separated into cream and skim milk by using a separator, such as a centrifugal separator, and thereafter part of the cream is remixed back into the skim milk such that a standardized milk product with pre-set fat content can be achieved. Since many dairy products have a fat content that is lower than a fat content of the raw milk, surplus cream is obtained. The surplus cream may be used for producing butter or other products.

Even though the general principle is well known, there is a number of challenges linked to fat standardization. One is that different batches of raw milk may have different fat content. This may be an effect of that the raw milk comes from different farms. An implication of that a composition of the raw milk, that is, a starting material, varies is that a system for fat standardization can be designed such that these variations does not affect an end product, that is, the fat standardized milk product.

Still a challenge is that the system is used for producing a variety of products with different fat content. Changing from producing products with a first fat content to products with a second fat content, that is different from the first fat content, results in that time is needed for adjusting the system as well as product losses or that already standardized milk needs to be fed back into the system to meet new requirements, that is, having the second fat content.

Modern fat standardization systems of today use a variation of different sensors placed in different parts of the system to provide for that changes in fat content can be detected quickly. To provide for that valves and other pieces of equipment can be adjusted in accordance with the changes, it is today common practice to have the sensors as well as the valves and other pieces of equipment communicatively connected to a controller such that the system can be adapted to the changes swiftly.

Even though modern control technology provides for that fat standardization systems can respond swiftly to changes in fat content, there is a need to further improve the systems such that different products with different fat content can be produced in a cost and time efficient manner.

SUMMARY

It is an object of the invention to at least partly overcome one or more of the above-identified limitations of the prior art. In particular, it is an object to provide improved fat standardization technology.

According to a first aspect it is provided a method for producing at least one fat standardized milk product, said method comprising separating raw milk RM into cream CR and skim milk SM, wherein the cream is fed to a main cream pipe and the skim milk is fed to at least one skim milk pipe, dividing the cream CR in the main cream pipe into at least one cream remixing pipe and a cream surplus pipe, combining the cream CR in the at least one cream remixing pipe and the skim milk SM in the at least one skim milk pipe into the at least one fat standardized milk product MP1, MP2, wherein the at least one fat standardized milk product is fed to at least one product pipe, and controlling a flow rate in the at least one cream remixing pipe by regulating a valve placed in the cream surplus pipe.

An advantage of controlling the flow rate by the valve placed in the cream surplus pipe is that a feed forward system is achieved, which provides for improved response time to changes in fat content of the cream.

The main cream pipe may be void of valves. An advantage of having the main cream void of valves is that the cream passing the main cream pipe is less subjected to mechanical stress, which affects product properties of the cream.

The at least one cream remixing pipe and the cream surplus pipe may be connected in parallel to the main cream pipe.

The at least one cream remixing pipe may comprise a first cream remixing pipe and a second cream remixing pipe, wherein the first cream remixing pipe may comprise a first cream valve and the second cream remixing pipe may comprise a second cream control valve, said method comprising controlling a first cream remixing flow rate in the first cream remixing pipe and a second cream remixing flow rate in the second cream remixing pipe by regulating the first cream control valve and the second control valve.

An advantage with this is that the first and second milk product MP1, MP2 can have different fat contents, which in turn provides the possibility to produce two different products simultaneously.

The at least one skim milk pipe comprises a first skim milk pipe and a second skim milk pipe, wherein the step of combining the cream in the at least one cream remixing pipe and the skim milk in the at least one skim milk pipe into the at least one fat standardized milk product, comprises combining the cream from the first cream remixing pipe with the skim milk from the first skim milk pipe into a first fat standardized milk product MP1, and combining the cream from the second cream remixing pipe with the skim milk from the second skim milk pipe into a second fat standardized milk product MP2.

A fat content of the first fat standardized milk product may be different from a fat content of the second fat standardized milk product.

The method may further comprise determining a density value of the cream by a density meter placed in the main cream pipe, and regulating the valve in the cream surplus pipe based on the determined density value.

The method may further comprise, during the combining of the cream and the skim milk into the at least one fat standardized milk product, collecting data representing a setpoint of the valve in the cream surplus pipe, collecting data representing a flow rate of cream past the valve in the cream surplus pipe at said setpoint, creating a database comprising the relationship between setpoints and flow rates for the valve in the cream surplus pipe.

The method may further comprise determining the flow rate of the cream in the cream surplus pipe based on at least: a flow rate of the raw milk; a fat content of the raw milk; a desired flow rate of the skim milk; and a desired fat content of the skim milk, and regulating the valve in the cream surplus pipe based on the setpoint obtained from the database and corresponding to the determined flowrate.

The raw milk may have a temperature from 3 to 25 degrees Celsius, more particularly a temperature from 3 to 16 degrees Celsius.

According to a second aspect it is provided a system for producing at least one fat standardized milk product, said system comprising a separator configured to separate raw milk RM into cream CR and skim milk SM, wherein the cream is fed to a main cream pipe and the skim milk is fed to at least one skim milk pipe, at least one divider arranged to divide the cream in the main cream pipe into at least one cream remixing pipe and a cream surplus pipe, at least one combiner arranged to combine the cream in the at least one cream remixing pipe and the skim milk in the at least one skim milk pipe into at least one product pipe such that the at least one fat standardized milk product MP1, MP2 is formed, and a valve placed in the surplus cream pipe configured to control a flow rate in the at least one cream remixing pipe.

The main cream pipe may be void of valves.

The at least one cream remixing pipe may comprise a first cream remixing pipe and a second cream remixing pipe, wherein the first cream remixing pipe may comprise a first cream control valve and the second cream remixing pipe may comprise a second cream control valve, such that a first cream remixing flow rate in the first cream remixing pipe and a second cream remixing flow rate in the second cream remixing pipe can be regulated by the first cream control valve and the second control valve.

The at least one skim milk pipe may comprise a first skim milk pipe and a second skim milk pipe, wherein the at least one combiner may comprise a first combiner arranged to combine the cream from the first cream remixing pipe with the skim milk from the first skim milk pipe into a first fat standardized milk product MP1, and a second combiner configured to combine the cream from the second cream remixing pipe with the skim milk from the second skim milk pipe into a second fat standardized milk product MP2.

A fat content of the first fat standardized milk product may be different from a fat content of the second fat standardized milk product.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
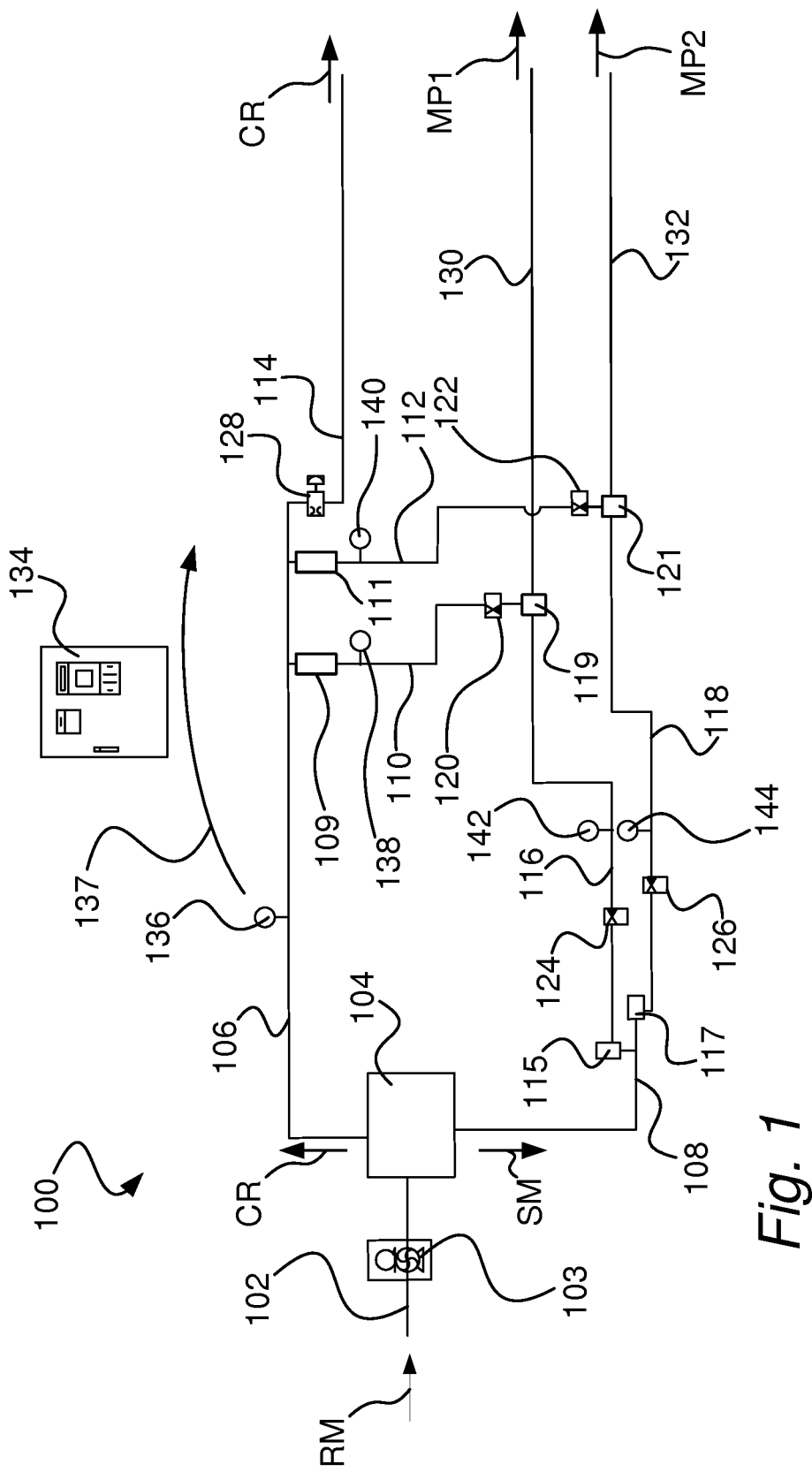
FIG. 1 is a general illustration of a system for producing a first and a second milk product.

With reference to FIG. 1, a system 100 for producing a first and a second standardized milk product MP1, MP2 is illustrated by way of example. Even though the example illustrated in FIG. 1 refers to two milk products, it is to be understood that the general concept may be used also for producing one milk product or more than two milk products.

Raw milk RM can be fed into the system 100 via a raw milk pipe 102 by using a raw milk pump 103. After having entered the system 100, the raw milk RM can be separated into cream CR and skim milk SM by using a separator 104. The cream CR can be fed from the separator 104 in a main cream pipe 106, also referred to as cream pipe, and the skim milk SM can be fed from the separator 104 in a main skim milk pipe 108.

By using at least one divider (valve or branch), herein illustrated by a first and a second divider 109, 111, the cream CR in the cream pipe 106 can be divided such that part of the cream is fed into at least one cream remixing pipe, herein illustrated by a first and a second cream remixing pipe 110, 112. Surplus cream, that is, cream CR that is not fed into the first or the second cream remixing pipe 110, 112, can be fed into a surplus cream pipe 114. The skim milk SM in the main skim milk pipe 108 can be divided into a first and a second skim milk pipe 116, 118 by using a third and a fourth divider 115, 117.

To form the first and the second standardized milk products MP1, MP2 at least one combiner is used, herein illustrated by a first and a second combiner 119, 121. The first milk product MP1 can be formed by that the cream CR fed via the first cream remixing pipe 110 is combined with the skim milk SM fed via the first skim milk pipe 116 by using the first combiner 119, and the second milk product MP2 can be formed by that the cream CR fed via the second cream remixing pipe 112 is combined with the skim milk SM fed via the second skim milk pipe 118 by using the second combiner 121.

To control a flow rate in the first cream remixing pipe 110 a first control valve 120 may be used. Correspondingly, to control a flow rate in the second cream remixing pipe 112 a second control valve 122 may be used. An advantage with having a possibility to control flow rates in the first and second cream remixing pipe 110, 112 individually is that different fat contents can be achieved in the first and second standardized milk products MP1, MP2. This may be beneficial for instance in that two batches of different products with different fat content may be produced simultaneously.

A further positive effect of producing more than one milk product in parallel is that it is possible to produce a milk product with a fat content that is higher than the fat content of the raw milk RM. For instance, with reference to FIG. 1, by concentrating a majority of the cream CR to the first cream remixing pipe 110 and dividing the skim milk SM in the main skim milk pipe 108 such that a majority of the skim milk is fed to the second skim milk pipe 118, the first milk product MP1 will have a fat content higher than the fat content of the raw milk RM while the second milk product MP2 will have a fat content lower than the fat content of the raw milk RM.

Further, to control a flow rate in the first skim milk pipe 116 a third control valve 124 may be provided, and to control a flow rate in the second skim milk pipe 118 a fourth control valve 126 may be provided.

As described above, the first and second control valves 120, 122 can be used to control how much cream CR that is fed into the first and second cream remixing pipe, respectively. To control how much cream CR that is fed into the first and second cream remixing pipe 120, 122 and the cream surplus pipe 114, respectively, a valve 128 placed on the cream surplus pipe 114 can be used. Controlling how much of the cream CR that is used for producing the first and second milk products MP1, MP2 and how much of the cream that is fed out of the system 100 as surplus cream by regulating the valve 128 placed on the cream surplus pipe 114 comes with a number of advantages.

Firstly, an advantage with using the valve 128 placed in the cream surplus pipe 114 for controlling the flow rate in the first and second cream remixing pipe 110, 112 is that a feed forward system with low response time can be achieved. For instance, if the fat content of the cream in the main cream pipe changes this may be compensated for by changing the valve 128 in the cream surplus pipe 114 such that a fat content of the milk products MP1, MP2 can be held within a predetermined range.

Secondly, having valves in the cream pipe 106 can be avoided. This has the advantage that the cream passing the cream pipe 106 and the first and second cream remixing pipe 110, 112 is less subjected to the mechanical stress caused by valves. In other words, by controlling the flow rate of the at least one cream remixing pipe by the valve 128 placed in the cream surplus pipe 114, it is made possible to only affect the cream passing the cream surplus pipe 114, while the cream passing the cream pipe 106 and the first and second cream remixing pipe 110, 112 is not affected or affected to less degree if there are valves provided in the first and second skim milk pipes 116, 118.

As illustrated, the first milk product MP1 may be fed out from the system 100 via a first product pipe 130, and the second milk product MP2 may be fed out from the system 100 via a second product pipe 132 to another system comprising e.g. a packaging machine, a heat treatment apparatus, a filtration apparatus for removing lactose or a dosing apparatus for adding ingredients to the milk products.

A control unit 134 can be provided for receiving input data from different sensors, such as flow transmitters, processing the input data into output data and transmitting the output data to different flow controlling devices, such as valves, in the system 100. Even though only one control unit 134 is illustrated, it is to be understood that this does not have to be a single piece of equipment, but that it may be a group of devices.

To monitor the fat content of the cream CR, a density meter 136 can be provided in the cream pipe 106. An advantage of determining a density value using the density meter 136 and providing this as input to the valve 128, either directly via a communication channel 137 or via the control unit 134, is that the density value is related to the fat content of the cream. In this way the valve 128 can be adjusted in accordance with the fat content of the cream, which in turn gives the positive effect that even if the fat content of the cream varies the fat content of the first and second milk product MP1, MP2 can be according to pre-set ranges. Even though the density meter 136 is used in the illustrated example for determining the fat content of the cream CR, it is to be understood that the feed forward system can be achieved also by using other types of sensors for determining the fat content of the cream. Further, to be able to monitor the system 100, flow transmitters 138, 140, 142, 144 can be provided in the first cream remixing pipe 110, the second cream remixing pipe 112, the first skim milk pipe 142 and the second skim milk pipe 144, respectively. The flow transmitters 138, 140, 142, 144 may be communicatively connected to the control unit 134.

Figure 2:
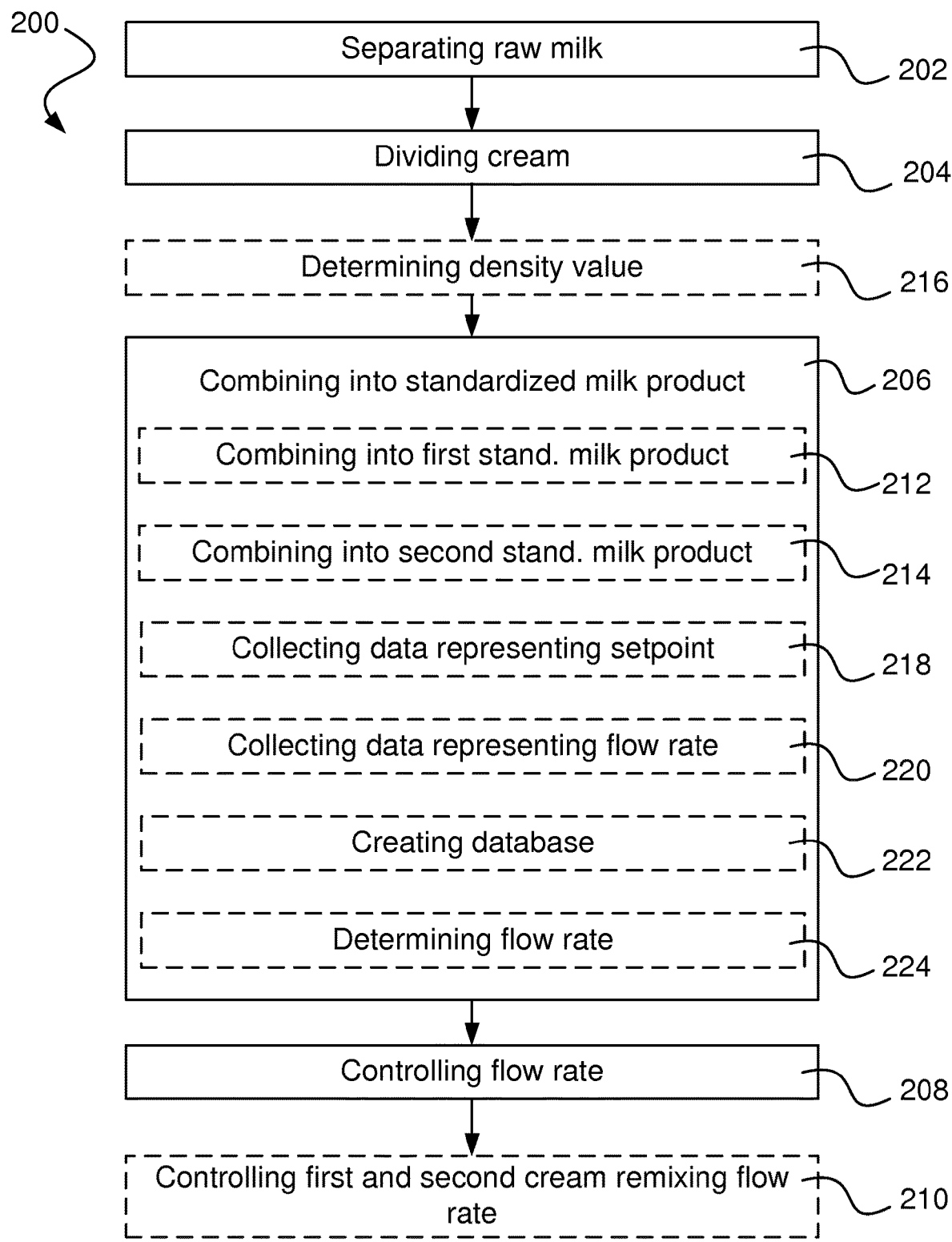
FIG. 2 is a flow chart illustrating a method for producing at least one fat standardized milk product.

FIG. 2 generally illustrates a flow chart of a method 200 for producing at least one fat standardized milk product, such as the first and second milk product MP1, MP2 referred to above.

First, the raw milk RM can be separated 202 into cream CR and skim milk SM.

After having separated into the skim milk SM and cream CR, the cream CR can be divided 204 into at least one cream remixing pipe, e.g. the first and second cream remixing pipe 110, 112, and the cream surplus pipe 114.

To form the at least one fat standardized milk product, e.g. the first and second milk product MP1, MP2, the cream CR in the at least one cream remixing pipe, e.g. the first and second cream remixing pipe 110, 112 can be combined 206 with the skim milk SM in the at least one skim milk pipe, e.g. the first and second skim milk pipe 116, 118.

By regulating the valve 128 in the cream surplus pipe 114, the flow rate in the at least one cream remixing pipe can be controlled 208. As described above, this provides for that the feed forward system is formed, which in turn, inter alia, improves the response time.

Optionally, by having the first and second cream regulating valve 120, 122 placed in the first and second cream remixing pipe 110, 112, a first and a second cream flow rate can be controlled. As described above, an advantage with this is that the first and second milk product MP1, MP2 can have different fat content.

In case the at least one cream remixing pipe comprises the first and second cream remixing pipe 110,112 and the at least one skim milk pipe comprises the first and second skim milk pipe 116, 118, the step of combining 206 can comprise combining 212 the skim milk in the first skim milk pipe 116 and the cream in the first cream remixing pipe 110 into the first standardized milk product MP1 and combining 214 the skim milk in the second skim milk pipe 118 and the cream in the second cream remixing pipe 112 into the second standardized milk product MP2.

Optionally, to determine 216 the fat content of the cream CR in the cream pipe 106, the density meter 136 providing the density value may be used.

Further, as part of the step of combining 206 the cream CR and the skim milk SM into the at least one fat standardized milk product MP1, MP2, data representing a setpoint of the valve 128 may be collected 218, data representing a flow rate of the cream past the valve 128 in the cream surplus pipe 114 may be collected 220, and a database comprising the relationship between setpoints and flow rates for the valve 128 in the cream surplus pipe 114 may be created 222.

Still further, also part of the step of combining 206 the cream CR and the skim milk SM into the at least one fat standardized milk product MP1, MP2, the flow rate of the cream in the cream surplus pipe 114 may be determined 224 based on at least a flow rate of raw milk RM, the fat content of the raw milk RM, a desired flow rate of the skim milk SM, and a desired fat content of the skim milk SM, and regulating the valve 128 in the cream surplus pipe 114 based on a setpoint obtained from the database and corresponding to the determined flow rate.

From the description above follows that, although various embodiments of the invention have been described and shown, the invention is not restricted thereto, but may also be embodied in other ways within the scope of the subject-matter defined in the following claims.

The invention claimed is:

1. A method for producing at least one fat standardized milk product, said method comprising:
   separating raw milk into cream and skim milk, wherein the cream is fed to a main cream pipe and the skim milk is fed to at least one skim milk pipe,
   dividing the cream in the main cream pipe into at least one cream remixing pipe and a cream surplus pipe,
   combining the cream in the at least one cream remixing pipe and the skim milk in the at least one skim milk pipe into the at least one fat standardized milk product, wherein the at least one fat standardized milk product is fed to at least one product pipe, and
   controlling a flow rate in the at least one cream remixing pipe by regulating a valve placed in the cream surplus pipe, wherein the at least one cream remixing pipe comprises a first cream remixing pipe and a second cream remixing pipe, wherein the first cream remixing pipe comprises a first cream valve and the second cream remixing pipe comprises a second cream control valve, the method further comprising:
controlling a first cream remixing flow rate in the first cream remixing pipe and a second cream remixing flow rate in the second cream remixing pipe by regulating the first cream control valve and the second control valve.

2. The method according to claim 1, wherein the main cream pipe is void of valves.

3. The method according to claim 1, wherein the at least one cream remixing pipe and the cream surplus pipe are connected in parallel to the main cream pipe.

4. The method according to claim 1, wherein the at least one skim milk pipe comprises a first skim milk pipe and a second skim milk pipe,
wherein the step of combining the cream in the at least one cream remixing pipe and the skim milk in the at least one skim milk pipe into the at least one fat standardized milk product, comprises:
combining the cream from the first cream remixing pipe with the skim milk from the first skim milk pipe into a first fat standardized milk product, and
combining the cream from the second cream remixing pipe with the skim milk from the second skim milk pipe into a second fat standardized milk product.

5. The method according to claim 4, wherein a fat content of the first fat standardized milk product is different from a fat content of the second fat standardized milk product.

6. The method according to claim 1, comprising:
determining a density value of the cream by a density meter placed in the main cream pipe, and
regulating the valve in the cream surplus pipe based on the determined density value.

7. The method according to claim 1, comprising,
during the combining of the cream and the skim milk into the at least one fat standardized milk product,
collecting data representing a setpoint of the valve in the cream surplus pipe,
collecting data representing a flow rate of cream past the valve in the cream surplus pipe at said setpoint,
creating a database comprising the relationship between setpoints and flow rates for the valve in the cream surplus pipe.

8. The method according to claim 7, comprising:
determining the flow rate of the cream in the cream surplus pipe based on at least
a flow rate of the raw milk,
a fat content of the raw milk,
a desired flow rate of the skim milk, and
a desired fat content of the skim milk, and
regulating the valve in the cream surplus pipe based on the setpoint obtained from the database and corresponding to the determined flowrate.

9. The method according to claim 1, wherein the raw milk has a temperature from 3 to 25 degrees Celsius.

10. A system for producing at least one fat standardized milk product, said system comprising:
a separator configured to separate raw milk into cream and skim milk, wherein the cream is fed to a main cream pipe and the skim milk is fed to at least one skim milk pipe,
at least one divider arranged to divide the cream in the main cream pipe into at least one cream remixing pipe and a cream surplus pipe,
at least one combiner arranged to combine the cream in the at least one cream remixing pipe and the skim milk in the at least one skim milk pipe into at least one product pipe such that the at least one fat standardized milk product is formed, and
a valve placed in the surplus cream pipe and configured to control a flow rate in the at least one cream remixing pipe,
wherein the at least one cream remixing pipe comprises a first cream remixing pipe and a second cream remixing pipe, wherein the first cream remixing pipe comprises a first cream control valve and the second cream remixing pipe comprises a second cream control valve, such that a first cream remixing flow rate in the first cream remixing pipe and a second cream remixing flow rate in the second cream remixing pipe can be regulated by the first cream control valve and the second control valve.

11. The system according to claim 10, wherein the main cream pipe is void of valves.

12. The system according to claim 10, wherein the at least one skim milk pipe comprises a first skim milk pipe and a second skim milk pipe, wherein the at least one combiner comprises:
a first combiner arranged to combine the cream from the first cream remixing pipe with the skim milk from the first skim milk pipe into a first fat standardized milk product, and
a second combiner configured to combine the cream from the second cream remixing pipe with the skim milk from the second skim milk pipe into a second fat standardized milk product.

13. The system according to claim 10, wherein a fat content of the first fat standardized milk product is different from a fat content of the second fat standardized milk product.

14. The method according to claim 9, wherein the raw milk has a temperature from 3 to 16 degrees Celsius.

* * * * *